Aug. 11, 1959     H. R. GULLIXSON     2,899,074
DEVICE FOR HOLDING FLAT ARTICLES OR THE LIKE
Filed July 24, 1956     4 Sheets-Sheet 1

INVENTOR
HAROLD R. GULLIXSON

BY Cushman, Darby & Cushman
ATTORNEYS

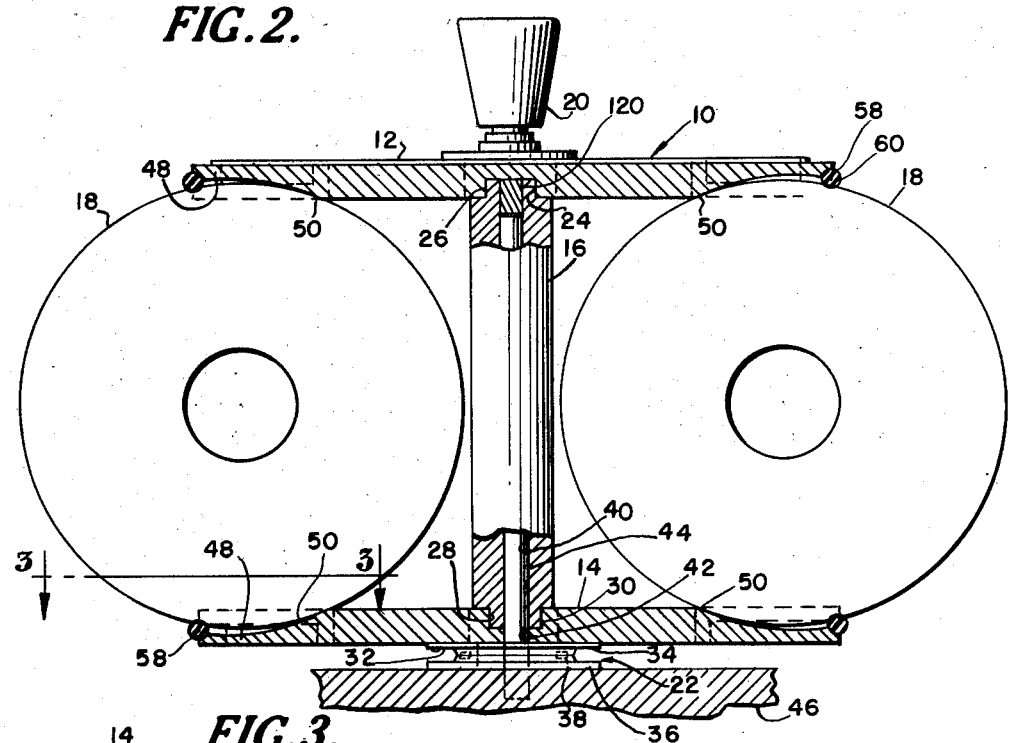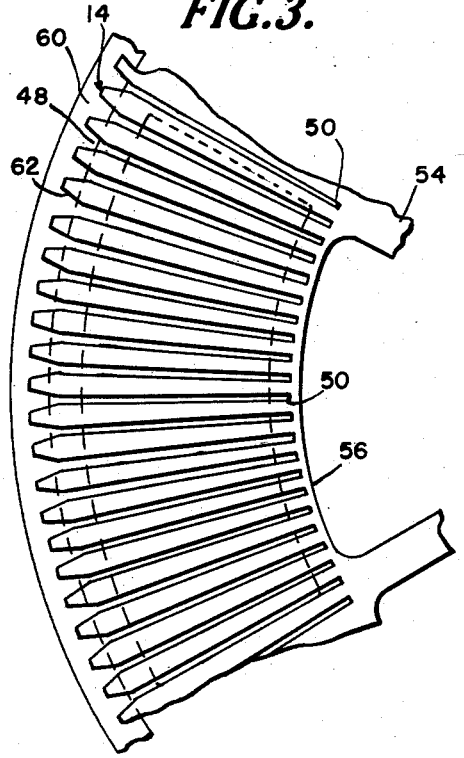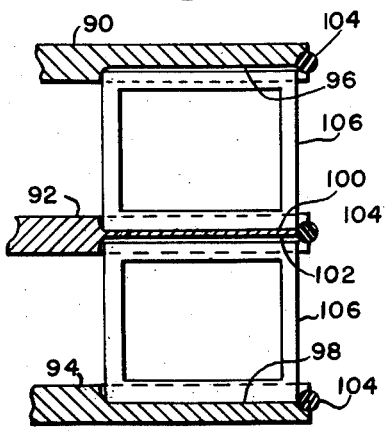

Aug. 11, 1959 H. R. GULLIXSON 2,899,074
DEVICE FOR HOLDING FLAT ARTICLES OR THE LIKE
Filed July 24, 1956 4 Sheets-Sheet 3

INVENTOR
HAROLD R. GULLIXSON

BY
ATTORNEYS

United States Patent Office 2,899,074
Patented Aug. 11, 1959

2,899,074

DEVICE FOR HOLDING FLAT ARTICLES OR THE LIKE

Harold R. Gullixson, Greensboro, N.C.

Application July 24, 1956, Serial No. 599,762

10 Claims. (Cl. 211—40)

The present invention relates to a device for storage of flat articles and, more particularly, to a device for the storage of disk-like articles, such as phonograph records, or the like, and rectangularly-shaped articles, such as photograph slides or the like.

In the storage of articles, such as phonograph records or photograph slides, it is necessary that the articles be separated from one another so that the surfaces thereof will not be scratched or harmed when the articles are inserted or removed from the storage device. Further, it has been found that in present day storage of articles, such as phonograph records, the records should be so stored that air may circulate freely between the records to prevent the same from warping. Although various devices, including cabinets and racks, have been provided for the storage of flat articles by retaining them on their edges, the present invention provides an improved holder whereby a maximum number of articles may be stored in a minimum space, the articles being easily accessible to the user of the device.

Therefore, an object of the present invention is to provide a holder for flat substantially rigid articles which will protect the articles, yet have the articles readily accessible for removal therefrom.

Still another object of the present invention is to provide a holder for flat articles, or the like, which will positively retain the articles therein, thereby permitting the holder to be moved from place to place without the danger of the articles falling therefrom.

A still further object of the present invention is to provide a holder for flat articles which has an improved guide means for insertion of the articles into the holder.

Still another object of the present invention is to provide a structure for holding a plurality of flat articles by their edges in spaced relationship to each other, the structure being so designed as to permit easy entry or removal of the articles therefrom.

A further object of the present invention is to provide a holder for flat articles which comprises a minimum of movable parts and which may be inexpensively manufactured.

These and other objects of the present invention will appear more fully in the following specification, claims and drawings, in which:

Figure 2 is a vertical sectional view of the device disclosed in Figure 1.

Figure 3 is a view taken on the line 3—3 of Figure 2.

Figure 8 is a fragmentary sectional view of still another modified form of the invention showing the invention utilized in supporting articles in tiers.

Figure 1:
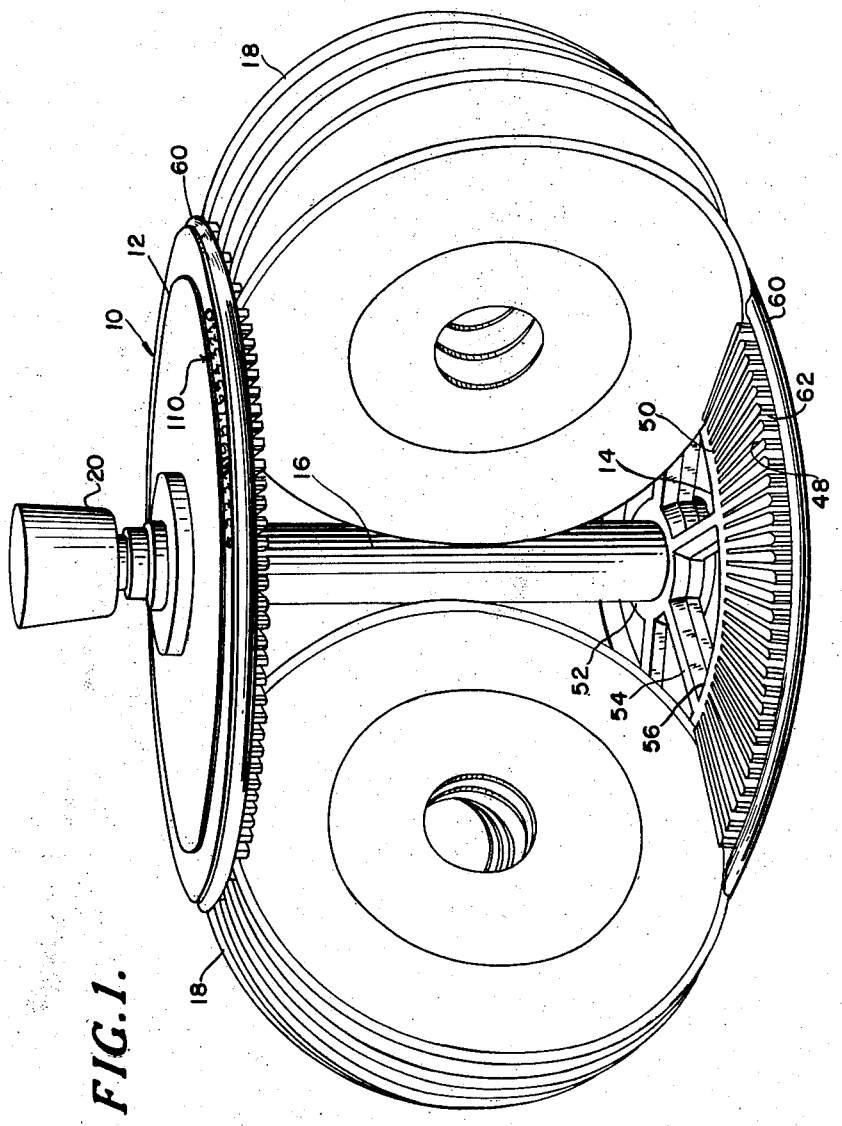
Figure 1 is a perspective view of a device of the present invention holding a plurality of disk-shaped phonographic records.
Figure 4:
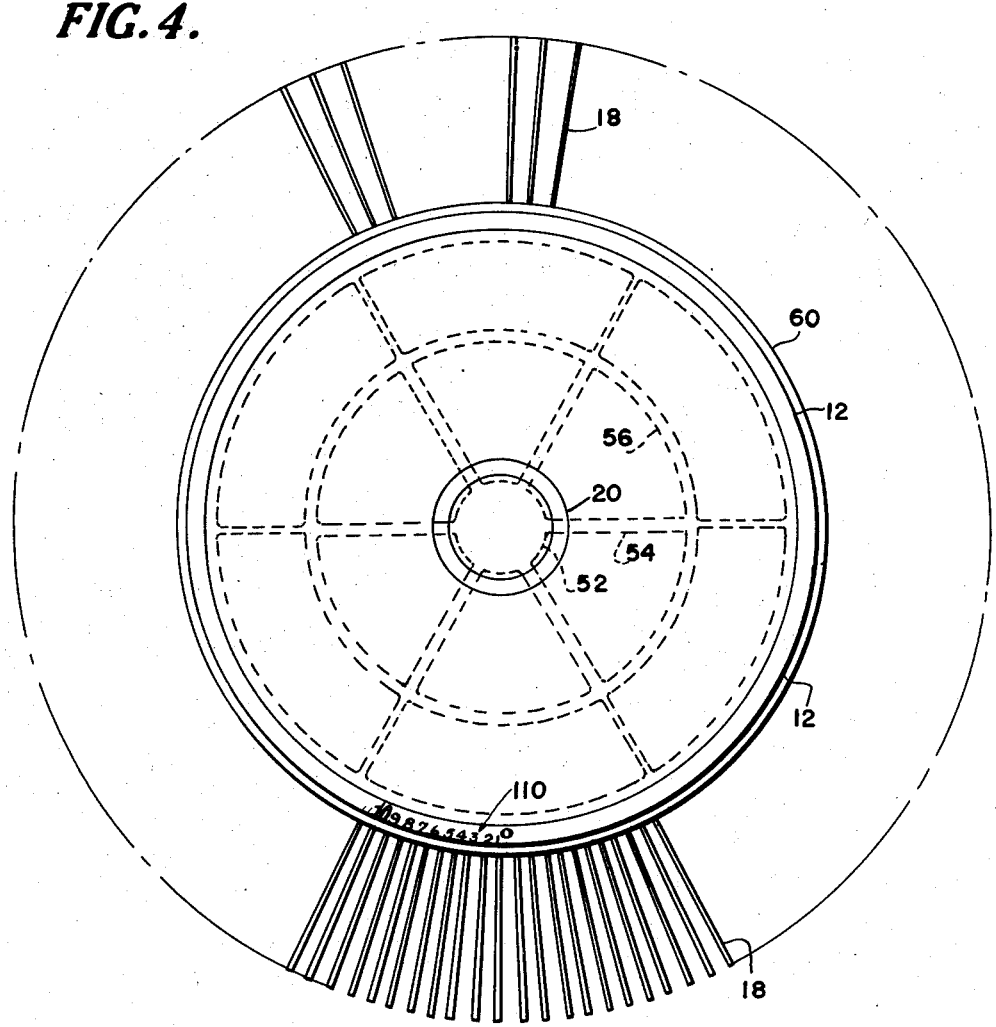
Figure 4 is a top plan view of the device disclosed in Figure 1.

Referring now to the drawings, wherein like character or reference numerals represent like or similar parts, the device of the present invention includes a frame structure generally designated by the numeral 10, the frame structure being provided with novel means for retaining flat articles by their edges in spaced relationship to each other. In Figure 1, the frame structure 10 is spool-shaped and includes an upper plate element 12, a lower plate element 14, and a central post 16 connecting the disk elements together. Plate elements 12 and 14 in this particular form of the invention are circular disks, but as will be explained later in the specification, may assume other shapes. The articles being held by the frame structure in Figure 1 are phonograph records 18 but it is of course within the scope of the present invention that other types of articles could be stored, such articles being either circular or rectangular, as will be explained in more detail later in the specification.

Referring now to Figure 2, the spool-like frame structure 10 is provided with a knob 20 on the upper disk element 12 and a bearing 22 on the lower disk element 14. In more detail, disk element 12 is provided with a counterbore 24 which receives the reduced end portion 26 of post 16. Likewise, the lower disk element 14 is provided with a counterbore 28 for receiving the reduced end 30 of post 16. The disk elements 12 and 14 may be secured to the post 16 in any suitable manner, such as by a press fit or by gluing. The knob 20 may be suitably secured to the upper disk element 12 for rotation therewith by screws (not shown) or the like. Bearing 22 is provided with an upper track or race 32 rigidly secured to the lower surface of disk element 14 by screws 34, or the like and a lower track or race 36. Suitable bearings 38 are provided between the upper and lower tracks 32 and 36, respectively.

Post 16 has a bore 40 therethrough which is adapted to align with a bore 42 in the lower disk element 14. By providing a bore through the lower disk element 14 and the post 16, the spool-shaped structure 10 can be mounted on a shaft 44 carried on a suitable plate 46. The plate 46, as shown in Figure 2, is mounted with the shaft 44 vertically. However, it is within the scope of the invention that the plate 46 could be mounted so that the shaft 44 extends horizontally thereby mounting the frame structure for rotation on a horizontal axis. The novel article-retaining means will retain the records in the frame structure 10 regardless of the position of the frame structure. Although the shaft 44 is shown as mounted on a plate 46 it is of course within the scope of the invention that the plate 46 could be a portion of a cabinet structure or could represent the surface of a wall. By having the frame structure so designed that it may be mounted on a shaft 44 it can be easily rotated thereon or it may be removed from one shaft 44 onto another shaft 44, as the user so desires.

Referring now specifically to Figures 1, 2 and 3, the disk elements 12 and 14 of the frame structure 10 are provided with a plurality of aligned article-receiving grooves 48 on their opposed planar surfaces. The term article-receiving grooves used throughout the specification is intended to cover slots, slits or the like, which could be formed in the elements 12 and 14 to receive the edges of articles 18. Article-receiving grooves 48 extend from the peripheral edge of the disk elements 12 and 14 radially inwardly and terminate in the surface of the elements, as indicated at 50 in Figures 2 and 3. The grooves 48 in Figure 2 are curved so as to receive the peripheral edge of the phonograph records 18. Since the inner surfaces of the disk elements 12 and 14 are spaced apart a distance less than the diameter of the phonograph records 18, the inner ends 50 of the grooves 48 provide stops for the phonograph records 18 and thereby limit the inward movement of the same. The grooves 48 are so designed that when one of the phonograph records 18 is positioned in a pair of aligned grooves, its edge nearest the center post 16 almost touches the center post. On the other hand, the grooves 48 could be extended radially inwardly toward the center post so that the center post itself would form the stop to limit the inner travel of the phonograph records 18.

If the frame structure 10 of Figure 1 is to be used to hold rectangularly-shaped articles, such as pictures mounted on rigid backings or photograph slides, the grooves in the disk elements 12 and 14 are of a constant depth as shown in Figure 8. A more detailed description of the modification shown in Figure 8 will appear later in the specification.

Disk elements 12 and 14 may be made of any suitable material, such as wood, plastic, or the like, and the grooves 48 may either be molded in the material or milled in the same. As shown in Figures 1 and 2, the disk elements 12 and 14 are molded with a center hub portion 52 having spokes 54 radiating therefrom and an outer rim 56 in which the grooves 48 are formed. The purpose of providing the spokes 54 rather than a solid disk element is to save on material and lighten the frame structure 10. It is of course understood that it would be within the scope of the present invention to make the disk elements 12 and 14 solid with the grooves 48 formed in the opposed surfaces thereof.

Figure 9:
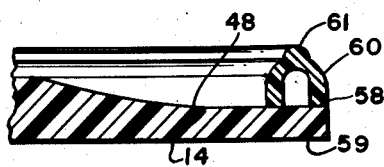
Figure 9 is a fragmentary sectional view of the invention showing a modified form of article retaining means.

The peripheral edge of the disk element 12 and 14 are provided with grooves 58. As shown in Figure 2, each of the grooves 58 is adapted to receive a resilient strip or ring 60. In the preferred form of the invention, the resilient strip or ring 60 is hollow or tubular, as shown in Figure 9 and is made of an elastomeric material such as rubber or a rubber substitute. As shown in Figure 9, the resilient strip 60 is hollow and fits into the groove 58 formed in the disk elements 12 and 14. In the embodiment of Figure 9, the groove 58 is formed by providing the disk elements with a circumferential flange 59 extending outwardly from the end of the article-receiving slot 48. Resilient strip 60 of the modification shown in Figure 9 is provided with a rib 61, the rib being so positioned on the strip 60 that it opposes a corresponding rib on the strip 60 of the other disk element. However, the strip 60 may be an O-ring, as shown in Figure 2 or it may have other cross-sectional shapes so long as it is compressible. The article-retaining rings or strips 60 when positioned in the grooves 58 in the upper and lower disk elements 12, as shown in Figure 2, are spaced apart a distance less than the diameter of the phonograph record 18. When it is desired to insert or remove a record from a pair of aligned grooves 48, the record will compress or spread apart the rings 60. Normally, when one of the phonograph records 18 is in position, as shown in Figure 2, the rings 60 will be fully expanded and will prevent the record 18 from accidentally falling out of the article-receiving grooves 48. By providing the rings 60 to positively retain articles in the aligned grooves 48 of frame structure 10, the device may be moved from one place to another or mounted either on a vertical axis or a horizontal axis without the danger of the records 18 falling from position. The user of the device must actually apply either an outward thrust when removing a record or an inward thrust when inserting a record to compress or spread apart the rings 60. The rings 60 are located on the periphery of the upper and lower disks 12 and 14, respectively, in such a relation to the inner end 50 of the grooves 48 that when a record is properly positioned in a pair of aligned article receiving grooves, the record is held from movement longitudinally of the grooves as the end 50 of the grooves provides an inner stop and the retaining-rings or strips 60 provide an outer stop.

In order to provide a guide for the phonograph records 18 when they are inserted into the article-receiving grooves 48 and also to provide a bigger tolerance so that when the compressible ring 60 is compressed or spread apart upon entry or removal of an article from the article-receiving grooves, the outer ends of the grooves 48 are chamfered, as indicated at 62. The chamfered inlet 62 of the article-receiving grooves 48 provides a wider entry for the insertion of the phonograph record 18 into the grooves and, thus, aids the user to find the proper pair of aligned article-receiving grooves. The chamfer 62 on the ends of the grooves also provides an area for the ring 60 to expand so that the record may be easily inserted or removed from the device.

Figure 7:
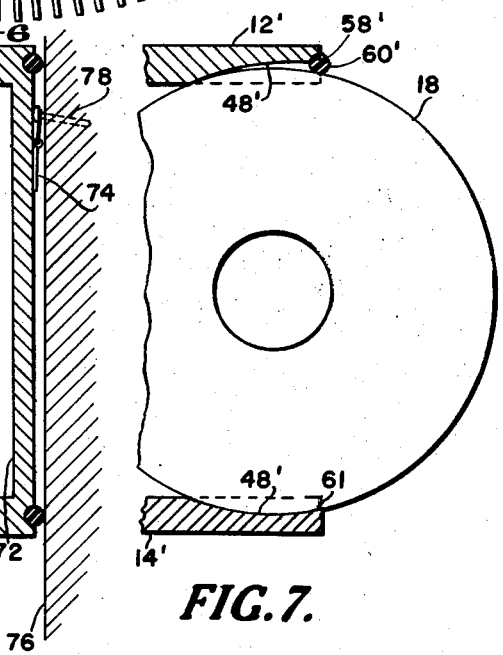
Figure 7 is a fragmentary vertical sectional view of a modified form of the invention.

Figure 7 discloses a modified arrangement of the article-retaining means. In Figure 7, the upper disk element 12' is provided with article-receiving grooves 48' which are aligned with article-receiving grooves 48' in the lower disk element 14'. In this particular embodiment of the invention only one of the disk elements 12' and 14' is provided with a groove 58' on its periphery. In this particular instance the groove 58' is located on the upper disk element 12' and an article-retaining ring 60' is positioned therein. The lower disk element 14' does not have a resilient article-retaining ring but in this particular instance the distance between the disk elements 12' and 14' is such that the ring 60' is spaced from the end 61 of the groove 48' in the lower disk element a distance less than the diameter of the phonograph record 18.

Figure 5:
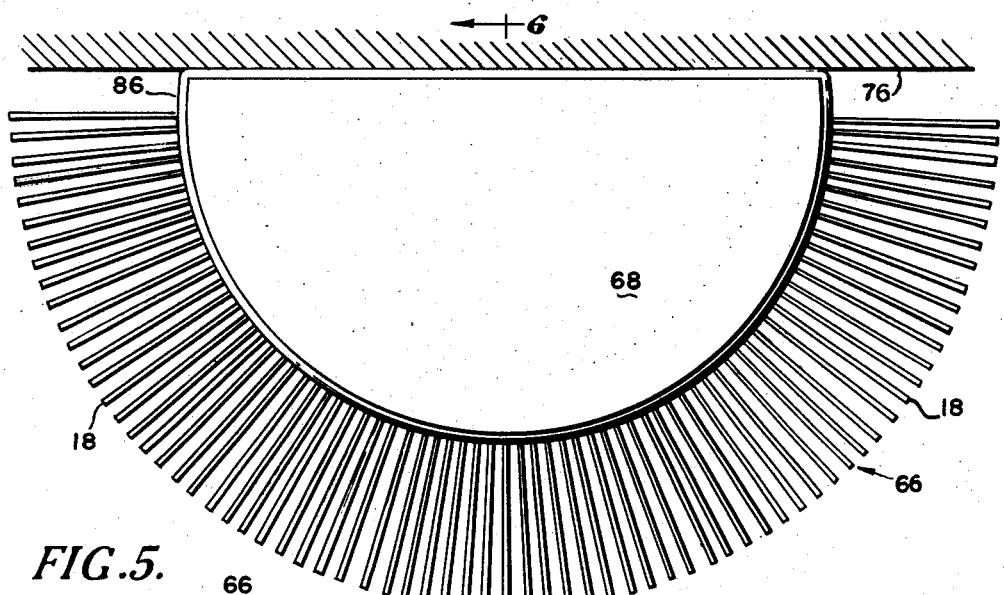
Figure 5 is a plan view of a modified form of the invention disclosed in Figure 1.
Figure 6:
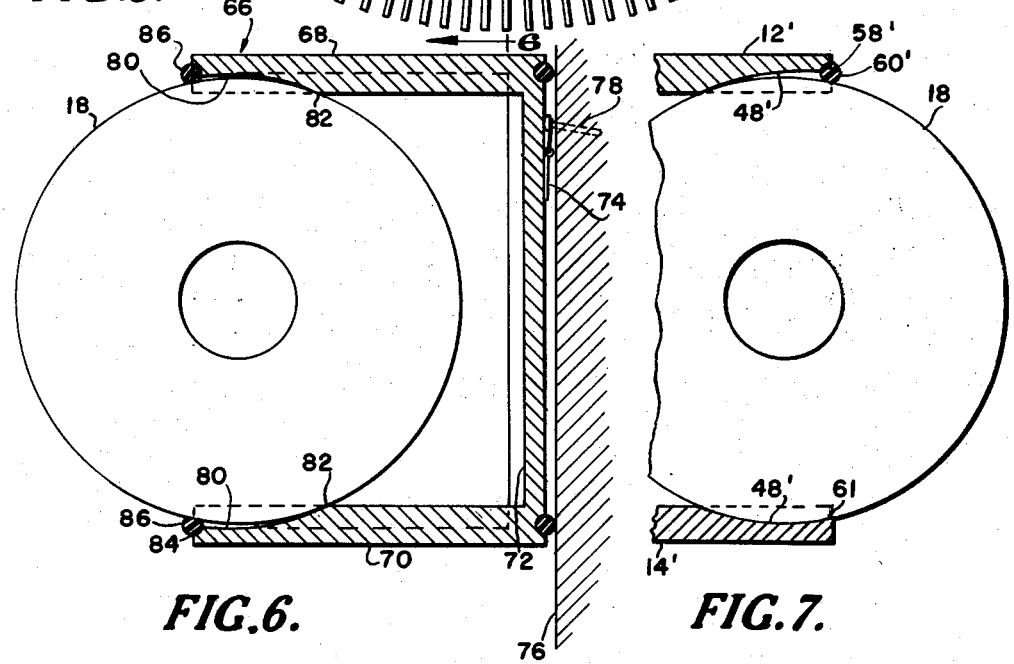
Figure 6 is a sectional view taken on the line 6—6 of Figure 5.

Referring now to Figures 5 and 6, a modified form of the article-holding structure is disclosed. In this form of the invention, the frame structure 66 includes an upper plate element 68 which is an arcuate-shaped disk element and a lower plate element 70 which is also an arcuate-shaped disk element. The plate elements 68 and 70 are spaced apart by a wall member 72 secured to and extending along the chord of the elements 68 and 70. The wall member 72 may be provided with a suitable hook 74 so that it may be fastened to a wall 76 by a nail 78 or the like. The upper and lower plate elements 68 and 70 are provided with aligned article-receiving grooves 80 in their opposed surfaces, the grooves 80 extending from the arcuated periphery of the elements inwardly on a radius of the elements to a position 82 where they terminate in the opposed surfaces of the plates.

Each of the plate elements 68 and 70 are provided with a groove 84 extending around their peripheral edge, the grooves 84 being adapted to receive a resilient article-retaining strip 86. As previously mentioned the article-retaining strip 86 may be an O-ring or may be a ring which is tubular, as shown in Figure 9, but since the ring is made of resilient material, such as rubber, rubber substitutes, or the like, it will assume the arcuate shape of the elements 68 and 70 when installed in the grooves 84. The phonograph records 18 may be inserted or removed from the article-receiving grooves 80 of the frame structure 66 in the identical manner previously described with reference to frame structure 10.

Referring now to Figure 8, a further modification of the device disclosed in Figure 1 is shown. In Figure 8, a plurality of plate elements 90, 92 and 94 are shown mounted in spaced relationship with each one above another. Any number of plates may be mounted in such spaced relationship, the purpose being to store articles in tiered relationship to each other about the periphery of the plate elements. As shown in Figure 8, the end plate elements 90 and 94 are provided with article-receiving grooves 96 and 98, respectively. The center plate element 92 is provided with article-receiving grooves 100 and 102 on its upper and lower surfaces, respectively. The article-receiving grooves between adjacent plate elements are aligned with each other, as shown in Figure 8 and, thus, the articles may be held one above the other in tiered relationship. Each of the plate element 90, 92 and 94 are provided about their peripheral edges with article-retaining rings 104. It will be noted that the article-retaining ring 104 of the plate element 102, which is positioned between the plate elements 90 and 94, serves the dual purpose of retaining the article between the upper and middle plate elements and the middle and lower plate elements, respectively.

In Figure 8, the articles 106 are disclosed as photographic slides. When the articles are rectangular in shape, the grooves 96 are made of a constant depth rather than curved, as in the case where phonograph records are stored. The grooves 96, 98, 100 and 102 terminate at their inner ends in the surfaces of their respective plates and, thus, form inner stops for the articles 106.

Since the article-storage devices of the present invention are capable of storing a plurality of articles in closely spaced relationship to each other, suitable means are provided for locating a particular article. In the present invention, the upper disk element may be provided with suitable indicia 110 on its upper surface numbering each of the article-receiving grooves 48. One of the articles stored in the device may be provided with corresponding numbers thereon and a space beside each number so that the title of the particular article may be inserted. When articles, such as phonograph records are stored, a blank record made of anodized aluminum may be used, the blank record having suitable numbers thereon and spaces to write the title of records opposite the numbers. The phonograph records are then stored in the corresponding numbered grooves so that when the user desires a particular record he merely looks for the title on the anodized index record and the number beside the same and then goes to that particular groove number of the device.

As previously mentioned, the center post 16 is tubular so that it may receive the shaft 44 mounted on the plate 46. Since the shaft 44 may be mounted vertically or horizontally, means are provided for retaining the frame structure on the shaft 44. A permanent magnet 120 is positioned in the bore 40 of post 16 at its upper end. The shaft 44 is made of a paramagnetic material and thus when the frame structure 10 is positioned on the shaft 44 it will be held against accidental removal from the shaft by the permanent magnet. By providing the permanent magnet 120 to retain the frame structure 10 on shaft 44, the frame structure can still be rotated without it becoming dislodged from the shaft.

The terminology used in this specification is for the purpose of description and not limitation, the scope of the invention being defined in the claims.

I claim:

1. In a device of the class described for holding substantially flat articles, a frame structure, said frame structure including spaced parallel plate elements, said elements having a plurality of aligned article-receiving grooves in their opposed surfaces, each pair of aligned article-receiving grooves being spaced apart a distance slightly greater than the width of an article being received therein, said article-receiving grooves extending from the edges of said elements inwardly therefrom to a point spaced from the edges thereof, and means carried by at least one of said elements adjacent its edge and restricting entrance of the grooves therein for retaining articles in aligned article-receiving grooves, said last mentioned means including a resilient strip carried on the edge of said element and restricting the entrance into each of the grooves of the element, said resilient strip being capable of compression to permit entry and removal of an article to and from one of the pairs of aligned article-receiving grooves while maintaining restriction of the other of said article-receiving grooves, said resilient strip being completely expanded when an article is in said article-receiving grooves to thereby retain the article in the aligned grooves without pressure on the article.

2. A device of the class described in claim 1, wherein said resilient strip is a hollow ring extending around the edge of the element.

3. A device of the character described in claim 1, wherein said resilient strip is an O-ring extending around the edge of the element.

4. A device of the character described in claim 1, wherein the ends of said grooves adjacent the edges of said elements are chamfered so as to provide a guide for the entry of the articles and an area for said strip to expand when the same is compressed by entry or removal of articles.

5. A device of the character described in claim 1, wherein said plate elements are circular disks.

6. A device of the character described in claim 1, wherein said plate elements are arcuate-shaped disks.

7. In a device of the class described for holding substantially flat articles, a spool-shaped frame structure, said frame structure including a center post and parallel spaced disks mounted on the ends of said center post, said spaced disks having a plurality of aligned article-receiving grooves in their opposed surfaces, each pair of aligned article-receiving grooves being spaced apart a distance slightly greater than the width of an article being received therein, said article-receiving grooves extending from the edges of said disks inwardly toward and terminating short of said center post, means carried by at least one of said disks adjacent its periphery and restricting entrance of the grooves therein for retaining articles in the aligned article-receiving grooves, said last mentioned means including a resilient strip carried on the peripheral edge of said disks and restricting the entrance into each of the grooves of the disk, said resilient strip being capable of compression to permit entry and removal of an article to and from one of the pairs of aligned article-receiving grooves while maintaining restriction of the other of said article-receiving grooves, said resilient strip being completely expanded when an article is in said article-receiving grooves to thereby retain the article in the aligned grooves without pressure on the article, and means for mounting said frame structure for rotation.

8. A device of the character described in claim 7, wherein said article-receiving grooves at their ends adjacent the edges of said disk are chamfered.

9. A device of the character described in claim 7, wherein said post is tubular to thereby provide mounting of said frame structure for rotation on a horizontal shaft.

10. A device of the character described in claim 7, wherein said center post is provided with a bore closed at one end by a permanent magnet and wherein said mounting means includes a shaft made of paramagnetic material and received in the bore in said center post.

References Cited in the file of this patent

UNITED STATES PATENTS

| | | |
|---|---|---|
| 1,421,391 | Bower | July 4, 1922 |
| 1,436,026 | Ferge | Nov. 21, 1922 |
| 2,482,572 | Avigdor | Sept. 20, 1949 |
| 2,511,730 | McClain | June 13, 1950 |
| 2,710,694 | Carr | June 14, 1955 |